June 6, 1972  B. Y. K. MUI  3,667,707
AIR SUPPORT
Filed April 22, 1970
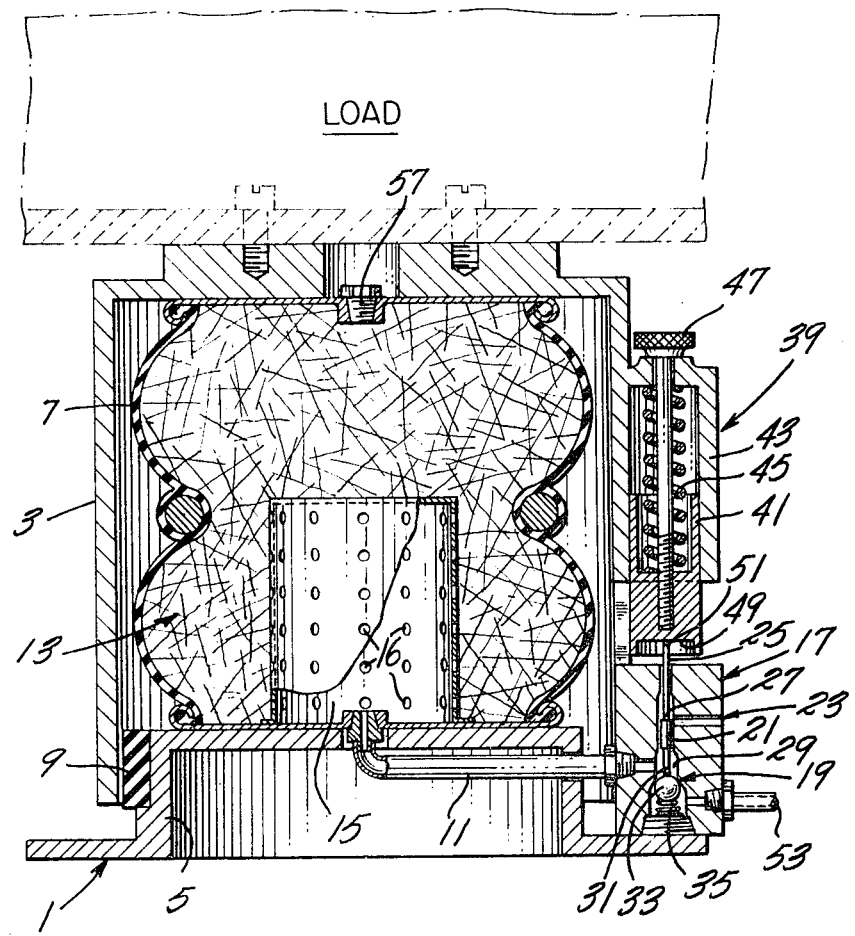
INVENTOR
BILLY Y. K. MUI
his ATTORNEYS United States Patent Office 3,667,707
Patented June 6, 1972

3,667,707
AIR SUPPORT
Billy Y. K. Mui, Astoria, N.Y., assignor to Korfund Dynamics Corporation, Westbury, N.Y.
Filed Apr. 22, 1970, Ser. No. 30,626
Int. Cl. F16f 11/00
U.S. Cl. 248—20
16 Claims

ABSTRACT OF THE DISCLOSURE

An air support for maintaining a load at a preselected height while isolating the load with respect to vibrations. The support includes a housing which is disposed above and in slidable engagement with a base. Support for the housing is provided by an inflatable bag to which compressed air is supplied through an air admission valve. When the housing moves downward from the preselected height, a rod forces the check valve open admitting additional air to the bag. The rod carries a piston journalled in a passageway whereby air is continuously allowed to escape from the system. If the housing moves above the preselected height by more than a predeterminted distance the rod also moves upward allowing additional air to escape from the bag to provide a fast return to the preselected height without or with a minimum of oscillation.

BACKGROUND OF THE INVENTION

This invention relates to an air support for maintaining a load, such as a machine, at a preselected height and for isolating the load with respect to vibrations.

There are a number of known devices which utilize a column of compressed air as a load carrying medium. Air is well suited for this use because it is highly elastic, it is not subject to permanent set, and its natural frequency is fixed and subject to control. Moreover, the spring rate of a column of air can readily be varied to compensate for variations in the supported load.

A variety of air supports are known which maintain a load at a preselected height. Conventionally, in such devices, a decrease in the height of the load caused by an increase in the force exerted on the support opens a valve to admit additional air to the system, thereby raising the pressure and causing the load to return to its preselected height. A second valve is also provided which allows air to escape from the system if the height of the load is increased in response to a decrease in the force exerted on the support. Devices of the above type have, in the past, embodied a number of disadvantageous characteristics. For instance, most known air supports produce a substantial resonant oscillation in response to an abrupt change in the force exerted on the support. This oscillation continues until the energy absorbed by the support has been dissipated. Since one of the principal objectives in using an air support is to eliminate vibrations in the supported load, it is highly desirable to prevent or minimize those resonant oscillations.

Another disadvantageous characteristic of conventional air supports is that the valves used are intended to be completely air tight. After the device has been in use for some time, the air seals of the valves ultimately begin to wear. Because the systems are designed to operate with sealed valves, the development of relatively small leaks upsets the operating parameters and greatly diminishes the effectiveness of the device. Another problem frequently encountered in connection with conventional air supports is that of damage to the mechanism in response to a change in the load of greater magnitude than that provided for in the design of the apparatus.

For all of the above reasons, there is a recognized need for sophisticated improvements in the design of air supports which would allow their inherent advantages to be more effectively utilized.

SUMMARY OF THE INVENTION

The present invention comprises a greatly improved air support for maintaining a load, such as a machine, at a preselected height and for isolating the load with respect to vibrations. The device includes a base suitable for mounting on a supporting structure such as the floor of a factory. A housing is disposed above and in slidable engagement with the base. An inflatable bag is disposed within the housing which supports the load at a preselected height above the base.

A height-control means is provided for controlling the movement of air into and out of the bag. The height-control means comprises an air admission valve for admitting air to the bag, a metering orifice connected to the air admission valve through which air is continuously allowed to escape and a fast return means for allowing air to escape when the housing moves upward from its preselected height by more than a predetermined distance. The function of the fast return means is to permit the housing to return to its preselected height quickly by providing for the rapid escape of a quantity of air from the system, thereby immediately decreasing the air pressure in the bag. This prevents or at least minimizes oscillation of the support following a sharp decrease in the supported load.

The air support is provided with a resilient over-travel means carried by the housing. The over-travel means prevents damage to the height-control means when the load moves downward. The over-travel means includes means for adjusting the position of a surface which engages a rod that operates the check valve. Thus, the preselected height at which the load is maintained can be varied.

The air support further includes a means for dampening low frequency vibrations and a means for dampening high frequency vibrations. The inflatable bag may be connected to a compressed air reservoir to change the spring rate of the support.

BRIEF DESCRIPTION OF THE DRAWINGS

For a complete description of the present invention reference can be made to the detailed description which follows and to the accompanying drawing in which the sole figure is a cross sectional side elevation of the air support of the present invention.

DESCRIPTION OF THE PREFERRED EMBODIMENT

The air support shown in the drawing includes a base 1 and a cylindrical housing 3 which is open at the bottom and slidably engages a raised cylindrical portion 5 of the base 1 which is of smaller diameter than the housing 3. The housing 3 is supported above the base 1 at a preselected height by an inflatable bag 7 disposed within the housing 3 which encloses a column of compressed air. A resilient chock 9 is disposed circumferentially about the raised portion 5 of the base 1 and restrains excess lateral movement of the housing 3.

Support for the load is provided by the compressed air in the bag 7 which is admitted through a conduit 11. Because it is a function of the air support to isolate a load with respect to vibrations, the bag 7 is filled with a low density material 13 to dampen high frequency vibrations which might be transmitted through the air column. This low density filler 13 also serves to attenuate sound transmission through the air support. The filler 13 may, for example, be loosely packed glass fibers or foam rubber.

Low frequency vibrations which might be transmitted through the support are dampened by a cylindrically shaped chamber 15 disposed within the bag 7 over the entrance point of the conduit 11. The chamber 15 contains a multiplicity of perforations 16 disposed about its surface through which air is permitted to pass in and out. This structure disrupts the air flow to prevent low frequency vibrations.

The compressed air which supports the load is admitted to the inflatable bag 7 through the conduit 11 by a height-control means 17 for controlling the passage of air into and out of the bag 7. The height-control means 17 includes an air admission valve 19 for admitting air to the bag 7, a metering orifice 21 through which air is continuously allowed to escape from the system, and a fast return means 23 for allowing air to escape rapidly when the housing 3 moves upward from the preselected height by more than a predetermined distance.

The fast return means 23 includes a rod-shaped moveable element 25 having a piston-like shoulder 27 integrally formed thereon which is disposed within a vertical passageway 29 adjacent the bag 7. The shoulder 27 of the rod 25 loosely engages the sides of the passageway 29 to form the metering orifice 21, referred to above, through which air escapes continuously at a controlled rate. A first end 31 of the rod 25 engages a ball 33 which is biased by a helical spring 35 against a valve seat at the end of the passageway 29 to form the air admission valve 19. Thus, the moveable element 25, which blocks the flow of air through the fast return means 23, is operatively connected to the air admission valve 19 by its engagement with the ball 33. This ball 33 forms an air admission valve closing member.

The air support also includes a resilient over-travel means 39 in which a plunger 41 is slidably disposed within a sleeve 43. A helical spring 45 within the sleeve 43 biases the plunger 41 toward one end of the sleeve 43. The plunger 41 is retained within the sleeve 43 by an adjustable setscrew 47. A recessed surface 49 which engages a second end 51 of the rod 25 is provided on the lower end of the plunger 41.

The air support operates in the following manner. It always seeks a preselected level at which the rod 25 bears down lightly on the ball 33 with a force just sufficient to allow enough air to enter the system through the admission valve 19 and an intake 53 to replace the air which escapes through the metering orifice 21. When the load on the housing 3 is increased it moves downward from its preselected height (in which it is shown in the drawing) and compresses the bag 7. The resilient over-travel means 39 then presses down on the rod 25 which in turn opens the valve 19 to admit additional air. This increases the pressure within the bag 7 and returns the load to its preselected height. The preselected height can, of course, be adjusted by turning the setscrew 47.

When the load on the support is decreased and the housing 3 moves upward from its preselected height, the admission valve 19 closes and the housing 3 is lowered as air escapes through the metering orifice 21. If the upward movement of the housing is sufficiently large, the rod 25 moves upward under the force of the compressed air in the bag 7 until the shoulder 27 passes the fast return orifice 23. With the shoulder 27 no longer disposed between the conduit 11 and the orifice 23, air from the bag 7 moves through the passageway 29 and escapes via the orifice 23 without passing through the metering orifice 21. The housing 3 is then quickly lowered to its preselected height without significant oscillation. A relatively large change in the load sufficient to allow air to escape directly through the orifice 23 would produce undesirable oscillations in the air support if it were not for the provision of this fast return means.

One purpose of the resilient over-travel means 39 is to prevent damage to the height-control means 17 in the event that the load on the housing 3 is increased by an amount sufficient to completely compress the spring 35 bringing the ball 33 to the end of its permitted range of travel. In this instance, the spring 45 within the sleeve 43 becomes compressed allowing the plunger 41 to be retracted into the sleeve 43, thus preventing damage to the mechanism.

An outlet 57 is provided at the top of bag 7 whereby a reservoir containing an additional volume of compressed air can be connected to the system. This provides a larger volume of air supporting the load which changes pressure in response to movement of the housing 3. The larger volume of air permits a larger movement of the housing 3 in response to a given change in the force exerted on it. Accordingly, the outlet 57 provides means for adjusting the spring rate of the air support.

It can be seen that, although the air suport is of relatively simple design, it embodies a number of sophisticated advantageous characteristics. The height at which the load is supported is adjustable as is the spring rate of the device. Provision is made for preventing damage to the device in the event of large fluctuations in the load. Means are provided for dampening both high and low frequency vibrations. Oscillation in response to a relatively large decrease in the force exerted by the load is prevented by the fast return means 23.

The air support is rugged and can be expected to have a long operational life in comparison to conventional air supports because its operating parameters are not dependent upon the ability of any of the values to be completely sealed. In fact, the design of the device is intended to allow air to escape continuously. This has the added advantage of permitting relatively large tolerances, thereby decreasing manufacturing costs.

It will be obvious to those skilled in the art that the above-described embodiment is meant to be merely exemplary and that it is susceptible of modification and variation without departing from the spirt and scope of the invention. Therefore, the invention is not deemed to be limited except as defined by the appended claims.

I claim:

1. An air support for maintaining a load at a preselected height and for isolating the load with respect to vibrations comprising a base adapted to be mounted on a supporting structure, a housing disposed above the base in slidable engagement therewith, an inflatable bag disposed within the housing whereby the housing can be supported at the preselected height, a height-control means for controlling the movement of air into and out of the bag comprising an air admission valve comprising a valve seat and a valve closing member operable to open said admission valve for admitting air to the bag, a metering orifice through which air is continuously allowed to escape at a controlled rate, and a fast return means for allowing air to escape rapidly only when the housing moves upward from its preselected height by more than a predetermined distance including a moveable element operatively connected to the air admission valve adapted to block the flow of air through the fast return means, whereby movement of the load above the preselected height by less than the predetermined distance is corrected by the escapement of air from the metering orifice and movement of the load above the preselected height by more than the predetermined distance is corrected by the escapement of air through the fast return means.

2. An air support as set forth in claim 1 further comprising a resilient chock disposed between the housing and the base.

3. An air support as set forth in claim 1 further comprising means for connecting a compressed air reservoir to the inflatable bag.

4. An air support as set forth in claim 1 wherein said height control means further comprises a passageway connecting the admission valve, the metering orifice, and the fast return means, and wherein a conduit is provided which connects the pasageway to the bag.

5. An air support as set forth in claim 1 wherein the fast return means includes a passageway and the moveable element of the fast return means is a reciprocable rod having first and second ends, the rod having a shoulder form thereon which loosely engages the sides of the passageway to form the metering orifice, the first end of the rod being engageable with the admission valve and the second end of the rod being engageable with a surface carried by the housing whereby the rod opens the admission valve when the housing moves downward from the preselected height.

6. An air support as set forth in claim 5 wherein the closing member of the admission valve is a ball which is resiliently biased against the valve seat.

7. An air support as set forth in claim 5 wherein said fast return means further comprises an opening provided in the side of the passageway, and a conduit which connects the passageway to the bag, the shoulder of the rod being disposed between said opening and the conduit when the housing is at its preselected height.

8. An air support as set forth in claim 5 further comprising a resilient over-travel means carried by the housing on which the surface that engages the second end of the rod is formed.

9. An air support as set forth in claim 8 wherein the over-travel means includes means for adjusting the position with respect to the housing of the surface that engages the rod whereby the preselected height of the housing can be adjusted.

10. An air support as set forth in claim 5 further comprising a means for dampening high frequency vibrations contained within the bag.

11. An air support as set forth in claim 10 further comprising a means for dampening low frequency vibrations contained within the bag.

12. An air support as set forth in claim 10 wherein the means for dampening high frequency vibrations is a low density filler material.

13. An air support as set forth in claim 12 wherein the filler material comprises glass fibers.

14. An air support as set forth in claim 12 wherein the filler material comprises foam rubber.

15. An air support as set forth in claim 5 further comprising a means for dampening low frequency disposed within the bag.

16. The air support as set forth in claim 15 wherein the means for dampening low frequency vibrations comprises a chamber having a multiplicity of perforations disposed about its surface.

References Cited

UNITED STATES PATENTS

| 2,706,607 | 4/1955 | Withers et al. | 248—22 |
| 3,095,187 | 6/1963 | Sweeney et al. | 248—358 X |
| 3,141,523 | 7/1964 | Dickie | 188—1 |
| 3,216,679 | 11/1965 | Curinen | 248—20 |
| 3,227,435 | 1/1966 | Greer | 248—358 X |
| 3,281,101 | 10/1966 | May | 267—118 X |
| 3,307,817 | 3/1967 | Cocito | 248—362 |

FOREIGN PATENTS

| 885,116 | 12/1961 | Great Britain | 248—358 |

J. FRANKLIN FOSS, Primary Examiner

U.S. Cl. X.R.

248—188.3, 358; 267—122